United States Patent [19]
Koppolu et al.

[11] Patent Number: 5,640,579
[45] Date of Patent: Jun. 17, 1997

[54] METHOD AND SYSTEM FOR LOGICALLY PARTITIONING A VIEW OF A DOCUMENT OBJECT FROM A FRAME IN WHICH THE DOCUMENT OBJECT IS DISPLAYED

[75] Inventors: Srinivasa R. Koppolu, Redmond; Richard J. Wolf, Seattle; C. Douglas Hodges, Redmond, all of Wash.

[73] Assignee: Microsoft Corporation, Redmond, Wash.

[21] Appl. No.: 506,073

[22] Filed: Jul. 24, 1995

[51] Int. Cl.⁶ ................................................. G06F 15/00
[52] U.S. Cl. ........................ 395/788; 395/683; 395/340
[58] Field of Search ..................................... 395/155–161, 395/144–148, 650, 700; 364/419.1, 943

[56] References Cited

U.S. PATENT DOCUMENTS

| | | | |
|---|---|---|---|
| 4,815,029 | 3/1989 | Barker et al. | 395/157 |
| 4,933,880 | 6/1990 | Borgendale et al. | 364/147 |
| 4,962,475 | 10/1990 | Hernandez et al. | 395/157 |
| 5,341,478 | 8/1994 | Travis, Jr. et al. | 395/650 |
| 5,467,472 | 11/1995 | Williams et al. | 395/600 |
| 5,495,581 | 2/1996 | Tsai | 395/154 |
| 5,537,526 | 7/1996 | Anderson et al. | 395/148 |

OTHER PUBLICATIONS

Brockschmidt, Kraig, *Inside OLE 2*, Microsoft Press, Redmond, WA, 1994, pp. 18–24; Chap. 9, "Compound Documents and Embedded Containers," pp. 487–563; Chap. 15, Visual Editing: In–Place Activation and In–Place Containers, pp. 843–905; Chap. 16, In–Place Activation for Compound Document Objects, pp. 907–956.

*Primary Examiner*—Kee M. Tung
*Assistant Examiner*—John E. Breene
*Attorney, Agent, or Firm*—Seed and Berry LLP

[57] ABSTRACT

A method and system are provided for logically partitioning a view of a document object from a frame in which the view is displayed. This enables a document object to control the appearance of its view when embedded within a container. The method and system enable a document object to control the page model of the view that it provides. The system may be implemented through "MICROSOFT" OLE 2.0 Interfaces. A view of a document object may be displayed in multiple frames and a frame may be used to display multiple views from different object types.

28 Claims, 13 Drawing Sheets

METHOD AND SYSTEM FOR LOGICALLY PARTITIONING A VIEW OF A DOCUMENT OBJECT FROM A FRAME IN WHICH THE DOCUMENT OBJECT IS DISPLAYED

TECHNICAL FIELD

The present invention relates generally to computer systems and, more particularly, to the presentation of views of objects in computer systems.

BACKGROUND OF THE INVENTION

The "MICROSOFT" Object Linking and Embedding (OLE) 2.0 protocol that was established by Microsoft Corporation of Redmond, Wash. adopts an object model. In accordance with this object model, an "object" is a logical structure that may encapsulate both code and data. In some instances, an object encapsulates only code and not data. An object that contains other objects (i.e., an object in which other objects are stored) is known as a "container."

The "MICROSOFT" OLE 2.0 protocol defines a number of "interfaces." An "interface" is a named set of logically related functions. An interface lists signatures, such as parameters, for a set of functions but does not provide code for implementing the functions. The code for implementing the functions of the interface is provided by an object as an instance of an interface. When an object provides code for implementing the functions of an interface, the object is said to "support" the interface. The code provided by the object that supports the interface must comply with the signatures set forth within the interface definition. In the C++ programming language, an interface constitutes a set of virtual functions.

The "MICROSOFT" OLE 2.0 protocol supports the notion of a "compound document." A "compound document" is a container object that contains a "linked object" and/or an "embedded object." An "embedded object" is a source object that is physically stored in the compound document. A "linked object" has a corresponding source object that is not physically stored in the compound document but rather resides somewhere else. The linked object may be viewed as a stand-in in the compound document that enables the source to be visibly present in the compound document while the source object is not stored within the compound document. The linked object provides a link to the source object. Thus, the primary distinction between a linked object and an embedded object is where the source object is stored. A compound document may be viewed as a collection site for data from a variety of other sources that seamlessly integrates data of different formats. An example of a compound document is a word processing document that contains an embedded spreadsheet that has been created by a spreadsheet program.

A "container application" is an application program that maintains a container, such as a compound document. The container application provides storage for the compound document and a place for displaying objects for a compound document. In the example given above, a word processing program is the container application for the compound document that includes the embedded spreadsheet. The compound document that is managed by a container application may be logically divided into a number of levels. FIG. 1 depicts a diagram of the different logical levels that are provided in the container application 10. The container application 10 holds a compound document 12, such as a word processing document, that includes one or more pages 14. At least one of the pages 14 includes a site 16 at which an object such as a spreadsheet is embedded.

As mentioned above, an embedded object may be visibly present when a compound document is displayed. The embedded object may be displayed in iconic form such that an icon for the embedded object appears on the page of the compound document. In order to edit the embedded object in such a case, the embedded object must be opened by performing an action such as double clicking on the icon, to display a separate window for the embedded object. "MICROSOFT" OLE 2.0 facilitates inplace editing. In such an instance, an "object view" of an embedded object is displayed within the compound document because the embedded object is being displayed in a foreign frame. The object view does not have control over the printed page. Further, when the embedded object is a document having multiple pages, only a single page of the embedded document may be displayed by the object view at the site on the page of the compound document.

A frame is a boundary that bounds or frames a view port. It may include menus, toolbars, status bars and the like (much as a picture frame frames a picture). A native frame is a frame produced by the application that created or is associated with the object whose view is being displayed inside the frame. An example of a native frame is a word processing program frame in which a view of a word processing document is displayed. With a foreign frame, the frame is produced by an application program that is not associated with the object whose view is being displayed herein. An example of a foreign frame is a word processing document frame in which an embedded spreadsheet object is displayed.

"MICROSOFT" OLE 2.0 defines an interface, IViewObject, that enables a caller to ask an object to provide a pictorial representation of itself by drawing on a caller-provided context. This interface is used to display embedded objects in compound documents. In formal terms, the IViewObject interface is defined as follows:

```
Interface IViewObject:IUnknown {
    virtual   HRESULT   Draw(dwAspect, lindex, pvAspect, ptd, hicTargetDev, hdcDraw,
                             lprcBounds, lprcWBounds, pfnContinue, dwContinue) = 0;
    virtual   HRESULT   GetColorSet(dwAspect, lindex, pvAspect, ptd, hicTargetDev,
                             ppColorSet) = 0;
    virtual   HRESULT   Freeze(dwAspect, lindex, pvAspect, pdwFreeze) = 0;
    virtual   HRESULT   Unfreeze(dwFreeze) = 0;
    virtual   HRESULT   SetAdvise(grfAspects, grfAdvf, pAdvSink) = 0;
    virtual   HRESULT   GetAdvise(pgrfAspects, pgrfAdvf, ppAdvSink) = 0;
};
```

As can be seen from this interface definition, the interface includes a number of functions: Draw(), GetColorSet(), Freeze(), UnFreeze(), SetAdvise() and GetAdvice(). The Draw() function is of particular interest to the present discussion. The Draw() function may be utilized by a container object, like a compound document, to request that an embedded object provide a presentation of itself to be drawn on an output device. The pictorial representation of the embedded object is displayed at a predetermined site 16 on a page 14. The pictorial representation is the "object view". In general, the embedded document is displayed in the container's context. The container controls the appearance of the page 14. The container controls the layout of headers, footers, end notes and the like. The embedded object has no control over these aspects of the page 14. The container also controls the amount of space that is allocated to the embedded object for displaying its pictorial representation. Specifically, the container object may call the SetExtent() function of the IOleObject interface that is defined by "MICROSOFT" OLE 2.0. These limitations of the view of the embedded object that is presented can be frustrating to the user and generally constitute unwanted constraints.

SUMMARY OF THE INVENTION

The difficulties encountered in displaying an object view of the embedded object in the prior art are overcome by the present invention. The present invention facilitates the displaying of a "document view" of an object regardless of whether the object is displayed in a native frame or in a foreign frame. The document view has control over the printed page, unlike an object view. In accordance with one aspect of the present invention, a method is practiced in a computer system that has a video display and an application program. In accordance with this method, a container object is provided along with a document object that is created by the application program. The document object is embedded in the container object. The foreign frame is foreign to the application program. A view of the document object is generated that has at least one page. The view constitutes a graphical representation of the document object and specifies how each page of the view is to appear. The view is then displayed in the foreign frame on the video display such that each page of the view appears as specified by the view.

The foreign frame may be provided by the container object or by another frame provider. In addition, the view of the document object may be displayed in other frames as well. Still further, a frame may be used to display other views of document objects as well. Each view may include multiple pages.

BRIEF DESCRIPTION OF THE DRAWINGS

A preferred embodiment to the present invention will be described below with reference to the following drawings.

DETAILED DESCRIPTION OF THE INVENTION

The preferred embodiment of the present invention logically partitions a view of a document object from a frame in which the view of the document object is displayed. A document object is broadly defined as an object that supports the IMso Document interface (described below). The frame merely specifies the location and dimensions of a view port to which the document object is to display a view. The view controls the page model and controls the dimensions of what is displayed within the view port. The provider of the frame may be a container in which the document object is stored or a separate frame provider. A document object may have multiple views associated with it. As a result, the view of a document object is freed in large regard from the limitations of the containment hierarchy in which the document object is embedded. The logical partitioning provided by the preferred embodiment of the present invention enables a single frame to be used to display different document objects of different object types and also allows a single view of a document object to be displayed in multiple frames.

Figure 1:
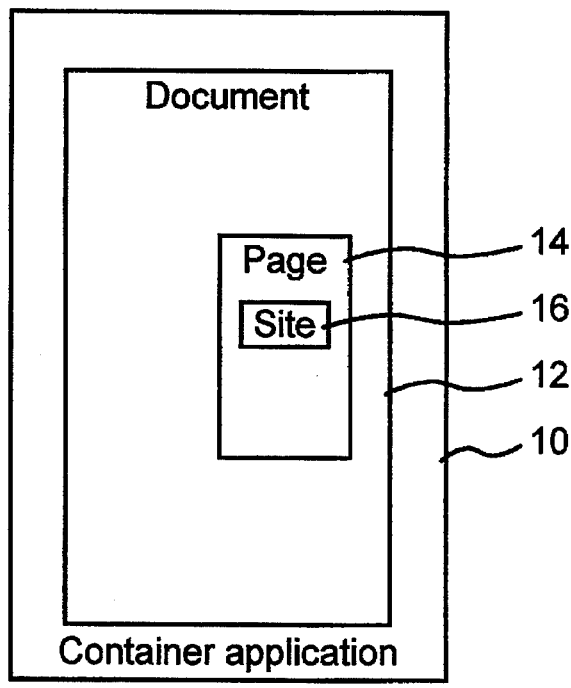
FIG. 1 depicts a depiction of the logical levels in a conventional container application.
Figure 2:
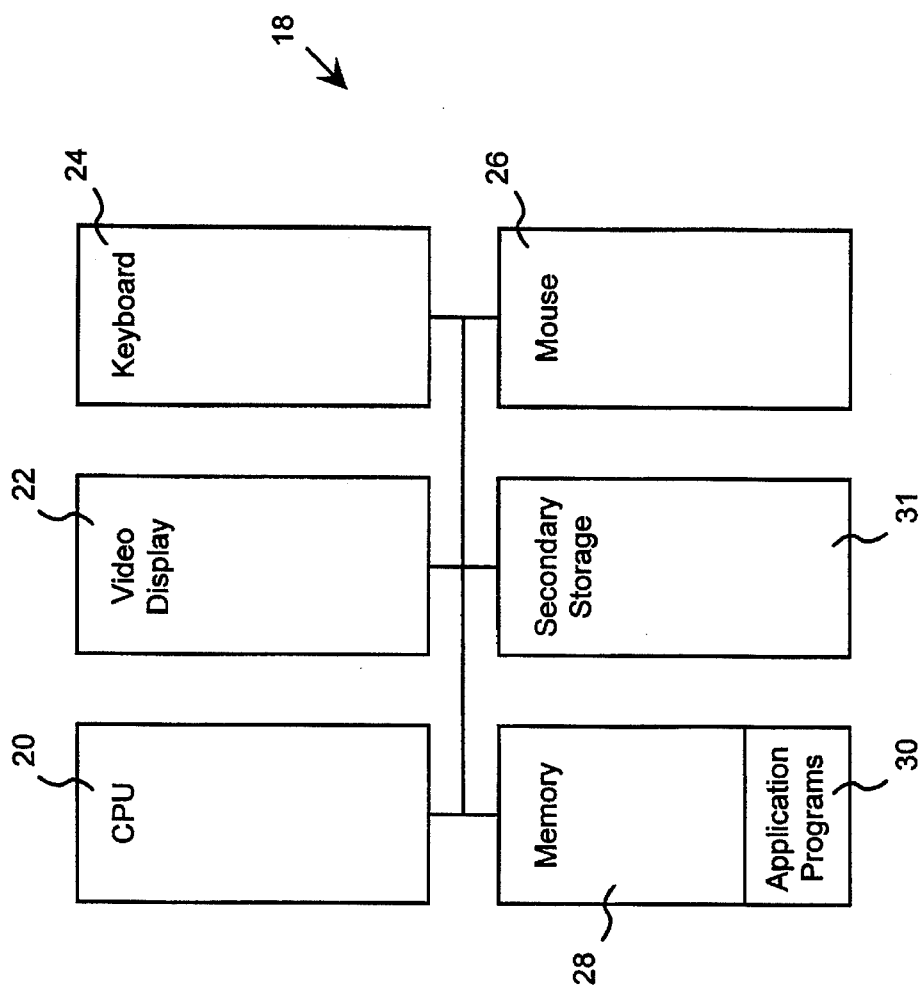
FIG. 2 depicts a block diagram of a computer system that is suitable for practicing the preferred embodiment of the present invention.

FIG. 2 is a block diagram of a computer system 18 that is suitable for practicing the preferred embodiment of the present invention. The computer system 18 includes a central processing unit (CPU) 20 that oversees operation of the computer system. Those skilled in the art will appreciate that although a single processor system is shown in FIG. 2, the present invention may also be practiced in multiple processor systems or in distributed systems. The CPU 20 has access to a number of peripheral devices, including a video display 22, a keyboard 24 and a mouse 26. A memory 28 and a secondary storage 30 are provided for storing code and data that is run on the CPU 20. In the preferred embodiment of the present invention, the memory 28 holds copies of application programs 30 that are utilized to practice the preferred embodiment of the present invention. As will be described in more detail below, the preferred embodiment of the present invention is implemented by objects that implement instances of interfaces.

In the preferred embodiment of the present invention, a graphical representation of a document object includes two components: a view frame component and a view component. The view frame component provides space for menus, toolbars, status bars, and the like. The view frame component also provides a view port for the document view of the document object. The document view can display itself with adornments like rulers, scroll bars, and the like. The view frame component does not tell the document how big its view should be. The view frame component only conveys the size of the view port, as selected by a user, to the view component.

Figure 3A:
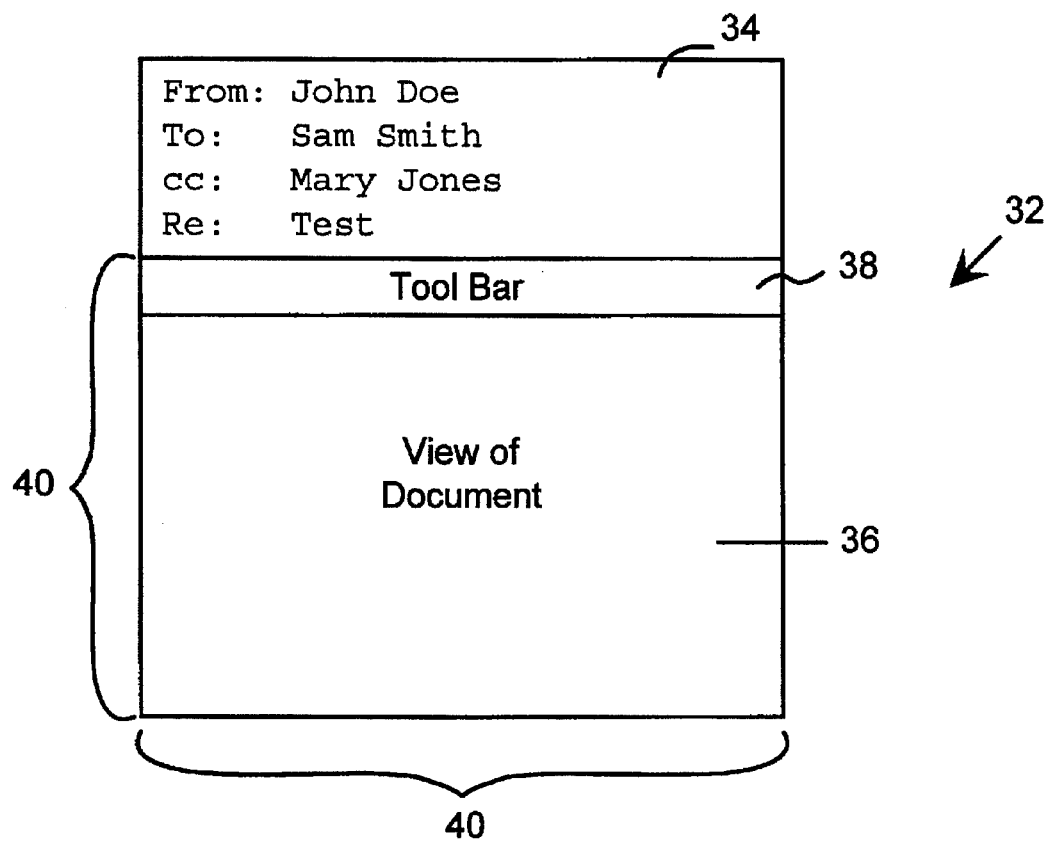
FIG. 3A depicts a mail message as presented in accordance with the preferred embodiment of the present invention.

A couple of examples are helpful to illustrate these components and to illustrate applications of the preferred embodiment of the present invention. FIG. 3A illustrates a document view 32 for a mail message. The document view 32 includes a view frame component 34 that has a header and a view port that takes the form of a rectangular region as designated by brackets 40 in FIG. 3A. The view port 40 is used to display a view of the document 36. This view of the document may include adornments, such as toolbar 38. In contrast, in certain conventional mail messages, a document can only be attached to a mail message such that an iconic view of the document is displayed in the mail message.

Figure 3B:
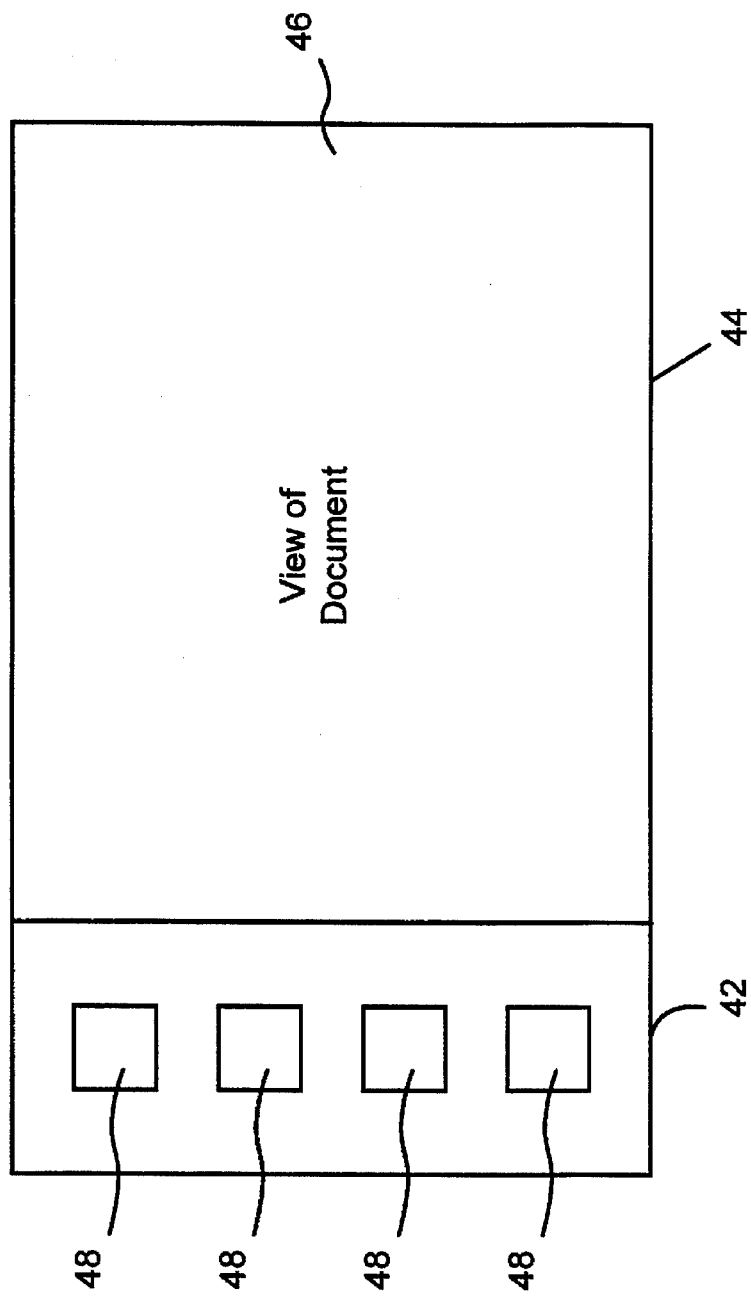
FIG. 3B depicts a frame and view of a document object in accordance with the preferred embodiment of the present invention.

FIG. 3B shows a second example that has a view frame component 42 and a view port 44 that holds a view of a document 46. The view frame component 42 holds a number of icons 48, each of which is associated with a corresponding document. When a user positions a mouse cursor over one of the icons 48 and clicks the mouse button, a view of the corresponding document is shown in the view port 44. Thus, a single view port may be utilized to display multiple documents over time. This capability is due in large part to the separation of the view presented in the view port from the view frame component. This is an example of a single frame being used to display multiple document objects that may be of different object types. One of the views displayed in this frame may be the mail message view displayed in frame 34 of FIG. 3A. As mentioned above, a single view of a document object may be displayed in multiple frames.

Figure 3C:
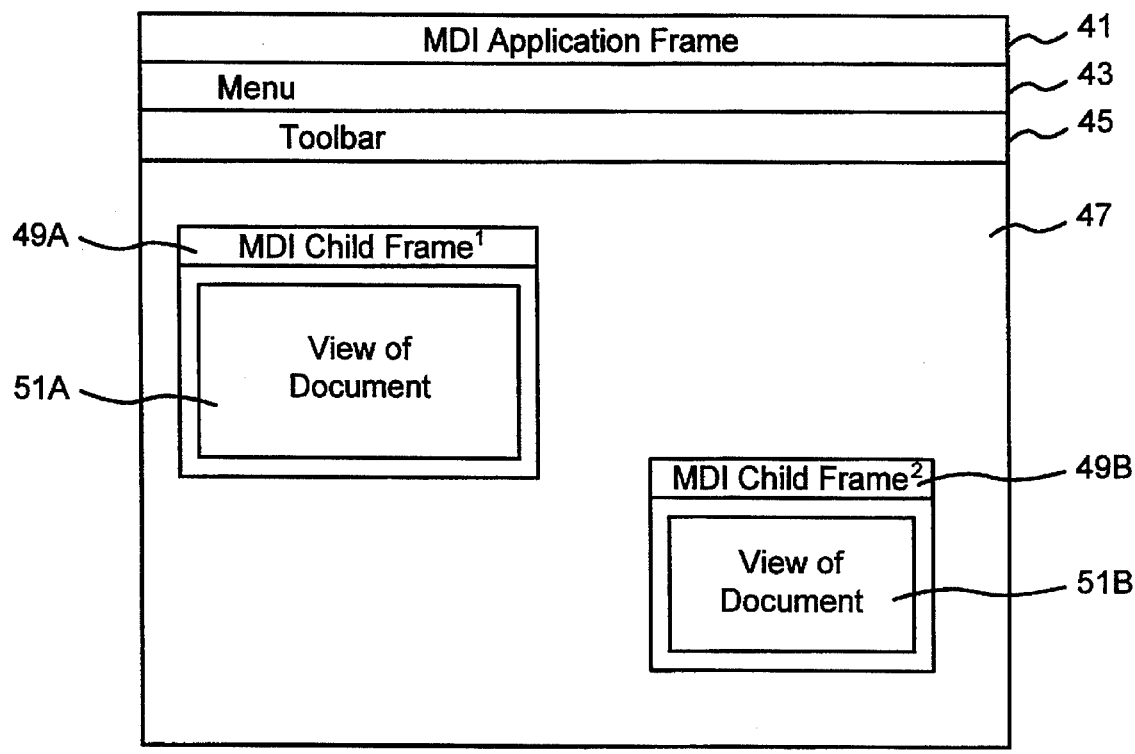
FIG. 3C depicts a multiple document interface (MDI) in which a document view completely fills child window frames in accordance with the preferred embodiment of the present invention.

FIG. 3C shows a third example in which a multiple document interface (MDI) is utilized. As is shown in FIG. 3C, an MDI application frame 41 includes a menu 43 and a toolbar 45, as well as a client area 47. MDI child frames 49A and 49B are shown within the client area 47 of the MDI application window. Each of the MDI child frames 49A and 49B holds a separate document view 51A and 51B, respectively, of corresponding document objects. These views of the documents 51A and 51B occupy the entire view port that are provided within MDI child frames 49A and 49B.

Figure 4A:
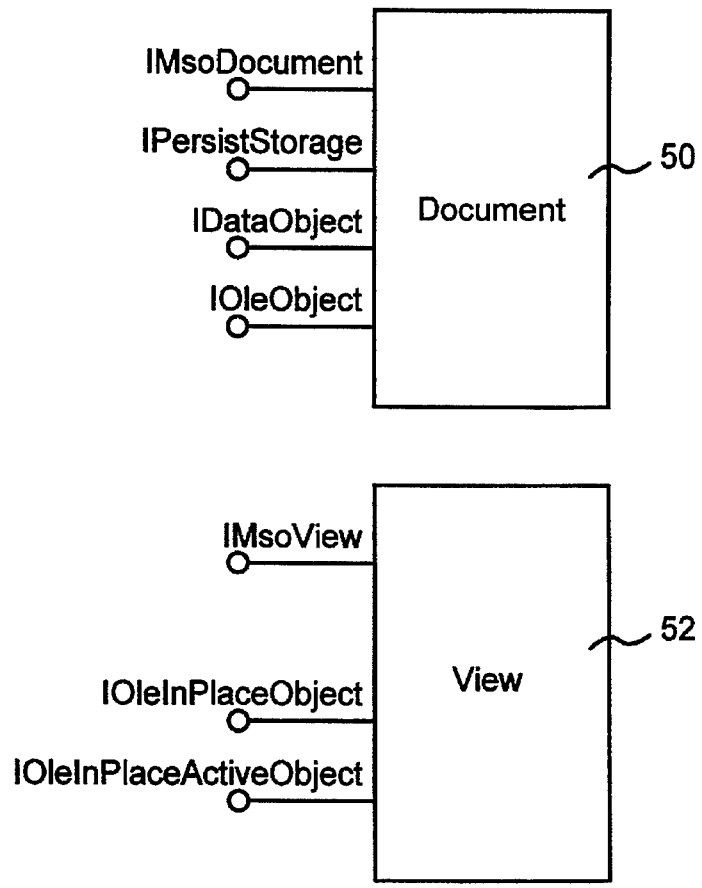
FIG. 4A is a block diagram depicting logical components of a server in accordance with the preferred embodiment of the present invention.

A number of logical components play a role in the preferred embodiment of the present invention. These logical components follow a client/server model wherein a client requests service from a server. FIG. 4A illustrates the components that play a role on the server side in the preferred embodiment of the present invention. The server side includes a document 50 and a view 52. The document 50 and the view 52 may be encapsulated into a single object or may constitute separate objects. In addition, multiple view objects may be provided for a single document 50. The lines with circles at the end that extend from the document 50 and the view 52 in FIG. 4A specify the interfaces that are supported by the respective logical components. For example, the document 50 supports the IDataObject interface. These interfaces will be described in more detail below. The interfaces that are shown in FIG. 4A are either standard "MICROSOFT" OLE 2.0 interfaces or new interfaces that are provided by the preferred embodiment of the present invention to embellish "MICROSOFT" OLE 2.0. On the server side, the IMsoDocument and IMsoView interfaces are the newly defined interfaces provided by the preferred embodiment of the present invention.

Figure 4B:
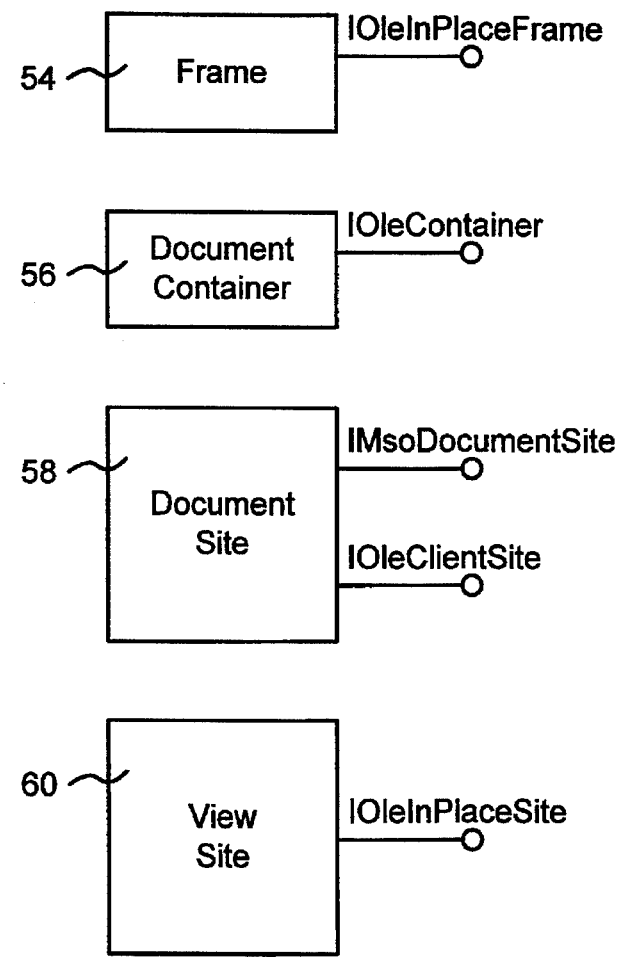
FIG. 4B is a block diagram depicting logical components of a client in accordance with the preferred embodiment of the present invention.

FIG. 4B shows the logical components on the client side of the preferred embodiment of the present invention. These logical components include a frame 54, a document container 56, a document site 58 and a view site 60. The frame 54 provides the frame for the document object. The document container 56 is the container that stores the document 50. The document site 58 serves as the site for the embedded document object. The document supports site 58 interfaces that enable the document 50 to communicate with the container 56. Lastly, the view site 60 serves as a site on the client for the view 52. The views in 60 supports interfaces that enables the view 52 to communicate with the container 56. The interfaces supported by the functional components are shown in FIG. 4B. The IMsoDocumentSite interface is a newly defined interfaces provided by the preferred embodiment of the present invention. The remaining interfaces are standard interfaces defined by "MICROSOFT" OLE 2.0.

A better understanding of the functional components described above may be achieved by further examination of the interfaces supported by such functional components. As such, the discussions set forth below will focus on these interfaces.

The document 50 (FIG.4A) supports at least three standard "MICROSOFT" OLE 2.0 interfaces. These standard interfaces are IPersistStorage, IDataObject and IOleObject. The IPersistStorage interface is the interface through which the document container 56 communicates with the document 50 about storage. This interface includes the same function for saving the object in its storage and a load function for loading an object into its loaded state. The IDataObject interface is the interface which enables data to be passed to and from the document 50. The IOleObject interface is the primary interface through which an embedded object provides functionality to its container.

The IMsoDocument interface is a newly provided interface and is unique to the preferred embodiment of the present invention. An object exhibits its ability to act as a document object by supporting this interface. The IMsoDocument interface is formally defined as follows:

```
interface IMsoDocument:IUnknown {
    virtual  HRESULT  CreateView(pipsite, pstm, dwReserved,
                                 ppview) = 0;
    virtual  HRESULT  GetDocMiscStatus(pdwStatus) = 0;
    virtual  HRESULT  EnumViews(ppenumview, ppview) = 0;
}
```

As can be seen from the definition of the IMsoDocument interface, the interface contains three functions. The first of these functions is the CreateView() function. The CreateView() function creates the new view or loads the previously saved view and returns a pointer to the associated view via the output parameter "ppview". The CreateView() function is called to ask the document to create a new view. This function is used to create new views as well as to load previously saved views. The CreateView() function has three input parameters and one output parameter. The first input parameter is the "pipsite" parameter that holds a pointer to the new view site for the newly created view. The second input parameter, "pstm", is null when a new view instances is being created and holds a pointer to a stream holding a previously saved view when the previously saved view is to be loaded. The third input parameter, dwReserved parameter, is reserved.

The IMsoDocument interface also includes the GetDocMiscStatus() function for retrieving miscellaneous information about a document object. In particular, a document object may include multiple views and may support complex rectangles in its views. This function retrieves such information and returns it in the pdwStatus output parameter.

The EnumView() function enumerates the views that are provided for the document object. If the document supports multiple views, this function returns a valid enumerator through the ppenumview output parameter and returns a null value for the ppview output parameter. In contrast, if the document only supports a single view, a null value is returned in the ppenumview output parameter and a pointer to the view is returned in the ppview output parameter.

The view 52 supports the IOleInPlaceObject and IOleInPlaceActiveObject interfaces. The IOleInPlaceObject includes functions for deactivating the object and its associated user interface. The IOleInPlaceObject interface is primarily used for a container to communicate with its contained objects. The IOleInPlaceActiveObject interface provides an interface for the container to communicate with currently active objects.

The View 52 also supports the IMsoView interface. This interface contains the functions that facilitate the behavior of the view that is logically partitioned from the frame in which it is displayed. The IMsoView interface is formally defined as follows:

```
interface IMsoView:IUnknown {
    virtual  HRESULT    SetInPlaceSite(pipite) = 0;
    virtual  HRESULT    GetInPlaceSite(ppipsite) = 0;
    virtual  HRESULT    GetDocument(ppunk) = 0;
    virtual  HRESULT    SetRect(lprcView) = 0;
    virtual  HRESULT    GetRect(lprcView) = 0;
    virtual  HRESULT    SetRectComplex(lprcView, lprcHScroll,
                        lprcVScroll, lprcSizeBox) = 0;
    virtual  HRESULT    Show (fShow) = 0;
    virtual  HRESULT    UIActivate (fActivate) = 0;
    virtual  HRESULT    Open(void) = 0;
    virtual  HRESULT    Close(DWORD dwReserved) = 0;
    virtual  HRESULT    SaveViewState(pstm) = 0;
    virtual  HRESULT    ApplyViewState(pstm);
    virtual  HRESULT    Clone(pviewsiteClone,
                        ppviewClone) = 0;
}
```

The SetInPlaceSite() function establishes the in-place site that encapsulates the view port and the frame context of the view port. This function sets a site pointer to the new site, as identified by the pointer in the "pipsite" input parameter. Each time that the SetViewSite function is called, the view detaches itself from current view site (if any) and sets the site pointer to the new site.

The GetInPlaceSite() function returns the current in-place site for the view. This value is returned in the "ppipsite" output parameter that holds a pointer to the location in which the view site is returned.

The GetDocument() function returns the document that is associated with the view. The SetRect() function sets the rectangular coordinates of the view port in the client coordinates of the view window. The view is resized to the coordinates that are passed. Conversely, the GetRect() returns the rectangular coordinates of the view port in client coordinates of the view window. The SetRectComplex() function sets the rectangular coordinates of the view port scroll bars and size box.

The Show() function is called to show or hide the view. The "fShow" input parameter is a Boolean value that when true, indicates that the view is to be shown and when false, indicates that the view is to be hidden. The UIActivate() function is called to UIactivate or deactivate the view. When the input parameter "fActivate" is true, the view is activated and deactivated when it is false.

The Open() function asks a view to display itself in a native window. For example, if a spreadsheet program is opened, it is displayed in a window for the spreadsheet program that is associated with it. The Close() function is called to close a view and release its site pointer. A container calls this function before it wants to delete a view.

The SaveViewState() function saves the current view state into a stream that is passed by the client to the view. Specifically, the "pstm" input parameter holds a pointer to a stream into which the view state is to be saved. The view state includes information such as view type, zoom factor and insertion point. The SaveViewState() function is typically called before deactivating a view. The ApplyViewState() function applies a previously saved view state to a view. The "pstm" input parameter is a pointer to the stream that holds the previously saved view state. The Clone() function creates a new view having a same view context as the view that provides the function but has a different view port. The "pipsiteClone" input parameter is a pointer to the in-place site for the clone that is to be created. The "ppviewClone" output parameter specifies the location where the pointer to the new view is to be returned.

The discussion will now focus on the interfaces provided in components on the client side. The frame 54 supports the IOleInPlaceFrame interface. Functions in this interface allow the insertion removal and manipulation of menus for the frame functions are also provided in this interface for displaying text on a status line and for enabling or disabling modeless dialogs.

The document container 56 supports the standard IOleContainer interface. This interface provides the ability to enumerate objects in a container and to keep a container running in the absence of other reasons for the container to remain running.

The IMsoDocumentSite interface is provided at the document site 58 (FIG. 4B). This interfaces is formerly defined as follows:

```
interface IMsoDocumentSite::public IUnknown {
    virtual  HSRESULT  ActivateMe
                       (pviewToActivate) = 0;
}
```

The IMsoDocumentSite interface includes only a single function, ActivateMe(). The ActivateMe() function is used to activate the document object 50. The function calls the CreateView() function in the IMsoDocument interface for all views that the document container wishes to show.

The DocumentSite 58 also supports the standard IOleClientSite interface, which is the primary interface by which an object requests services from its container.

The view site component 60 supports the IOleInPlaceSite interface. This interface includes a number of functions that allow an in-place object to communicate with its immediate container. Thus, the view 52 communicates with the view site 60 via number functions in the IOleInPlaceSite interface.

Figure 5:
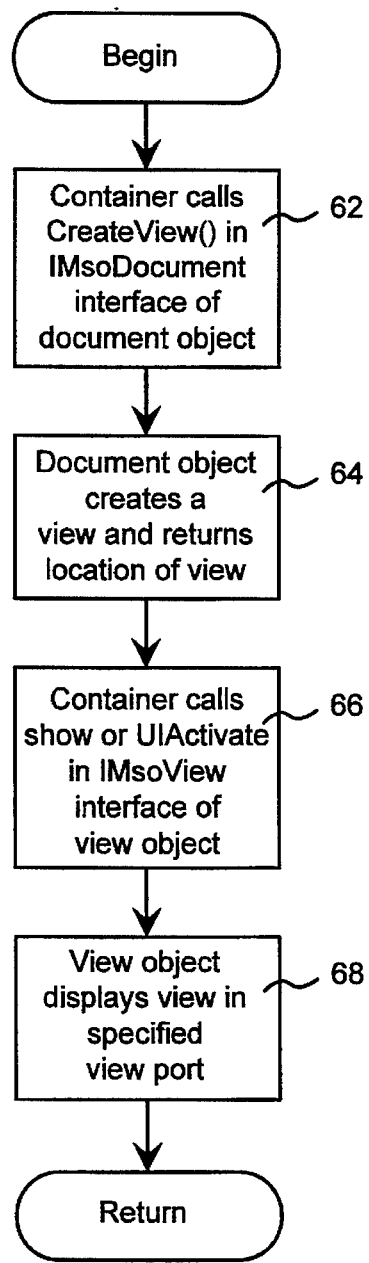
FIG. 5 depicts a flow chart of the steps that are performed to display view of a document object in accordance with the preferred embodiment of the present invention.

FIG. 5 shows a flowchart illustrating the steps that are performed to display a document view of a document object in a view port of a foreign frame. Initially, the container 56 which contains the document object 50 calls the CreateView() function in the IMsoDocument interface instance that is provided by the document object (step 62). The document object 50 that creates the view or loads the view as specified by the parameters to the CreateView() function call and returns a pointer a memory location for the view (step 64). The container 56 then calls the Show() or UIActivate() functions in the instance of the IMsoView interface that are provided by a view object 52 (step 66). The view object 52 then displays the view in the view port that is specified in the parameters that are passed to it (step 65).

The above discussion is focused on instances wherein there is one view for a document and one view site and frame for the view of the document. The preferred embodiment of the present invention, however, supports a document having multiple views and a container having multiple view sites.

Figure 6A:
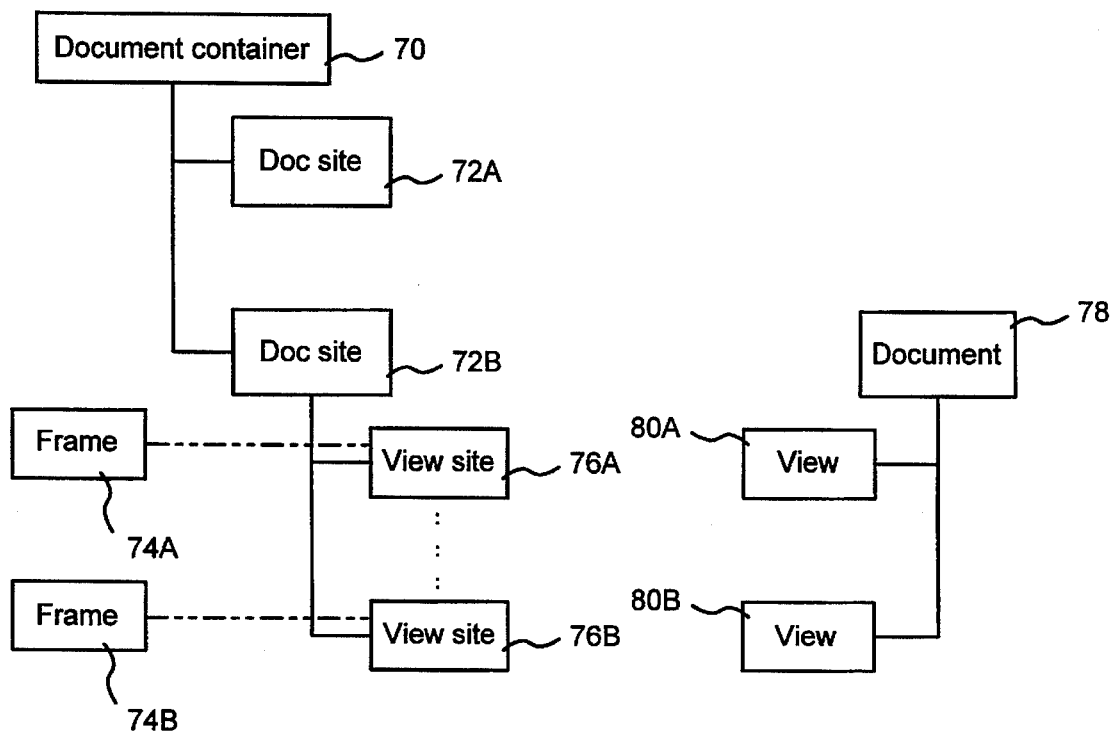
FIG. 6A-6E depict alternative configurations of frames, view sites, and views in accordance with the preferred embodiment of the present invention.
Figure 6B:
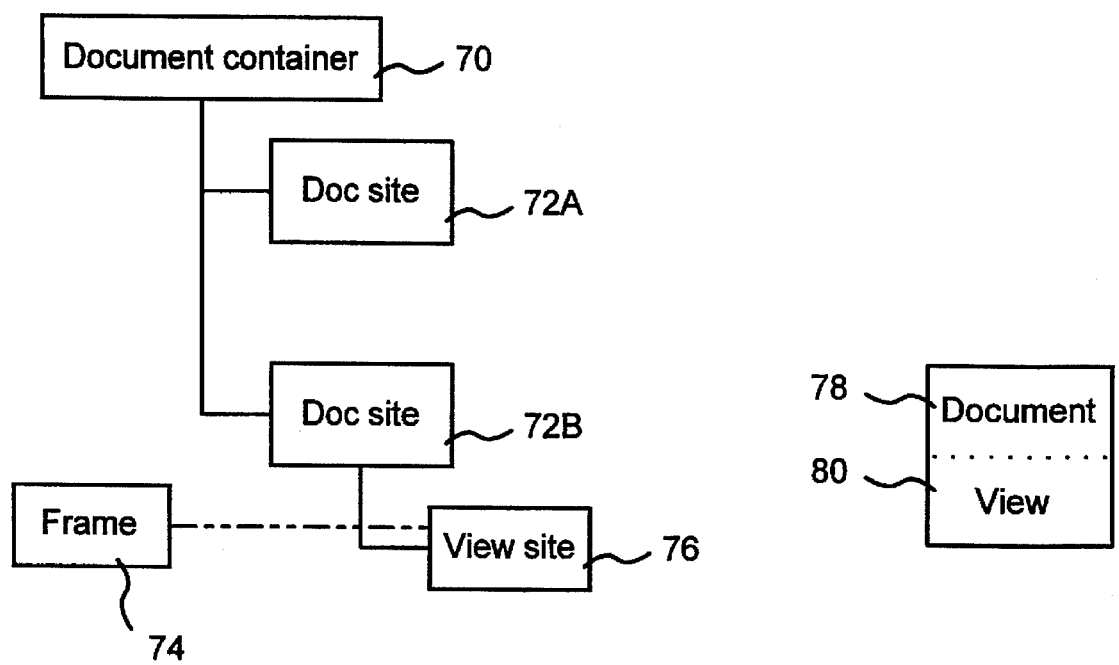

FIG. 6A shows an example where a document container 70 includes document sites 72A and 72B. Document site 72B includes view sites 76A and 76B that have associated frames 74A and 74B. View 80A of document 78 is displayed in view site 76A and an additional view 80B of the document is displayed in view site 76B. FIG. 6B shows an instance wherein the document container 70 supports multiple document sites 72A and 72B and multiple views but the document object 78 only supports a single view 80. The document objects 78 and 80 are displayed as a single object of FIG. 6B as an optimization. In addition, only a single frame 74 and a single view site 76 are displayed because the document object 78 only supports a single view 80.

Figure 6C:
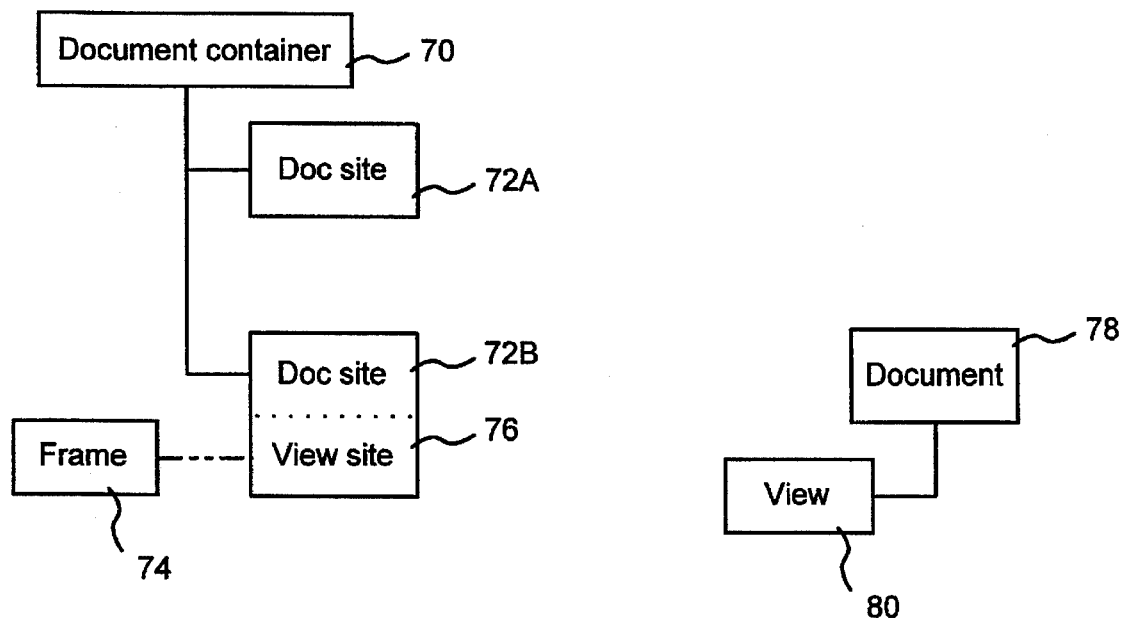

FIG. 6C shows an instance wherein a document object container supports only a single view site 76 with a corresponding frame 74 while the document object 78 supports multiple views 80. Only a single view 80 is shown in FIG. 6C because the other view lacks associated view site in the document container.

Figure 6D:
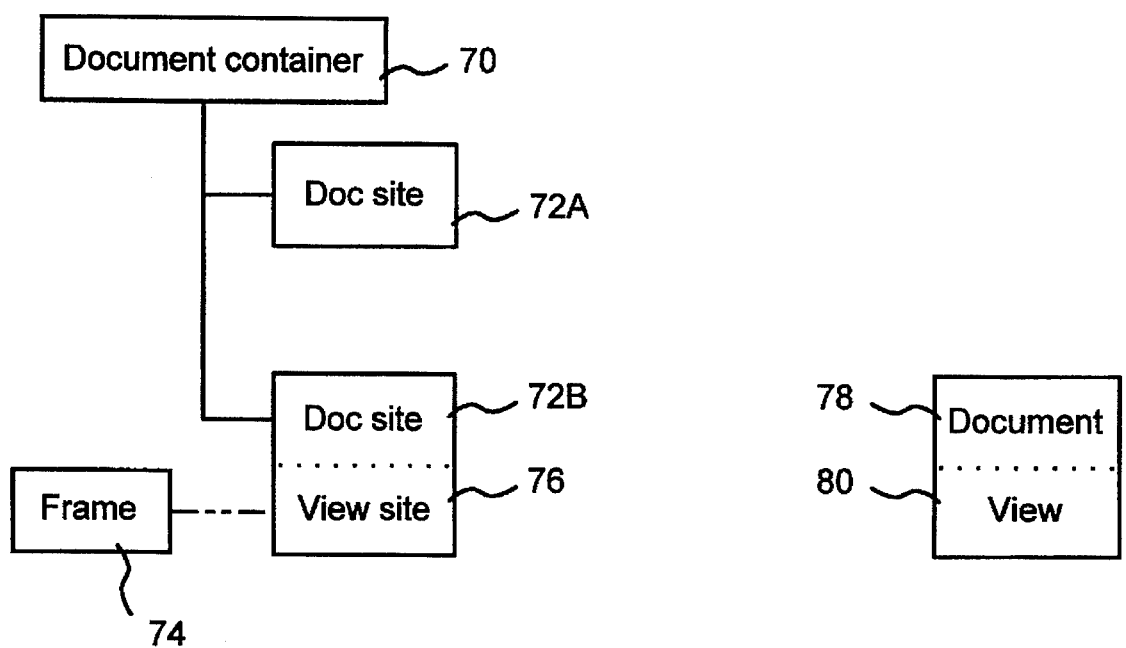
Figure 6E:
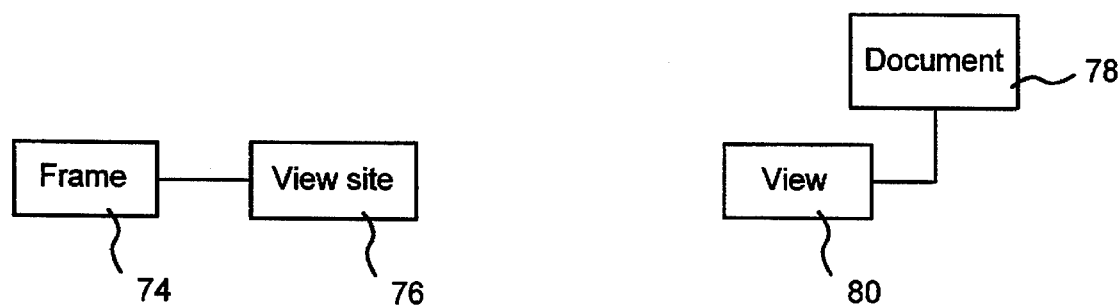

FIG. 6D shows an instance wherein the document object container 70 only supports a single view as does the document object 78. It should be appreciated that the view frame provided need not be the document object container. FIG. 6E shows an instance wherein the frame 74 and view site 76 are provided by a view frame provider other than document object container. View 80 of document object 78 is displayed at the view site 76.

As can be seen from the above discussion, the newly provided interfaces facilitate the logical partitioning of the view of a document object from the view frame. This logical partitioning facilitates independence of the view frame from the view that is depicted in the viewport provided by the frame. The interfaces also enable a document object to support multiple views.

The present invention has been described with reference to a preferred embodiment thereof, those skilled in the art will appreciate that various changes in form and detail may be made to the present invention without departing from the intended scope of the present invention as defined in the Appended claims.

We claim:

1. In a computer system having a video display and an application program, a method comprising the steps of:
   providing a container object;
   providing a document object that is created by the application program and that is embedded in the container object;
   providing a foreign frame that is foreign to the application program;
   generating a view of the document object constituting a graphical representation of the document object having at least one page, said view specifying how each page appears; and
   displaying the view of the document object in the foreign frame on the video display such that each page appears as specified by the view.

2. The method of claim 1 wherein the foreign frame is provided by the container object.

3. The method of claim 1 wherein the foreign frame is provided an independent frame provider other than the container object.

4. The method of claim 1 wherein the view has multiple pages.

5. The method of claim 1 wherein the view includes a graphical representation of a toolbar.

6. The method of claim 1 wherein the computer system includes a secondary storage holding the view and wherein the step of generating the view comprises the step of retrieving the view from the secondary storage.

7. The method of claim 1 wherein the step of generating the view of the document object comprises the step of creating the view.

8. The method of claim 1 wherein the step of providing the foreign frame comprises the step of specifying a view port of a given size in the foreign frame into which the view is to be displayed in the displaying step and wherein the step of generating the view further comprises the step of determining a size for the view based on the given size of view port.

9. In a computer system having a video display, a method comprising the steps of:
   providing a compound document that includes a container object and an embedded object;
   providing a view frame by the container object;
   generating a view of the embedded object constituting a graphical representation of the embedded object having at least one page, said view specifying how each page appears;
   specifying a view port in the view frame of the container object where the view of the embedded object is to be displayed; and
   displaying the compound document on the video display by displaying the view frame and the view of the embedded document in the view port.

10. The method of claim 9 wherein the view of the embedded object includes multiple pages.

11. In a computer system having a video display, document objects of different object types and a frame provider for providing a frame that is displayed on the video display, said frame having a view port, a method comprising the steps of:
   providing a view for each of the document objects, each view comprising a graphical representation of the document object having at least one page and specifying appearance of each page;
   displaying the frame that is provided by the frame provider on the video display;
   displaying the view provided for a first one of the document objects in the view port of the frame; and
   subsequently, ceasing to display the view provided for the first one of the document objects while maintaining displaying of the frame and displaying the view for a second one of the document objects in the view port of the frame.

12. The method of claim 11 wherein the document objects are embedded in the frame provider.

13. The method of claim 11 wherein the first one of the document objects is of a different object type than the second one of the document objects.

14. In a computer system having a video display, a method comprising:
   providing a first frame provider for displaying a first frame, having a view port, on the video display and a second frame provide for displaying a second frame, having a view port, on the video display;
   providing a document object;
   generating a view for the document object constituting a graphical representation of the document object having at least one page wherein said view specifies how each page appears;
   displaying the view for the document object in the view port of the first frame; and displaying the view for the document object in the view port of the second frame.

15. The method of claim 14 wherein the view for the document includes a graphical representation of a toolbar.

16. In a computer system having a video display and a document object, a method comprising the steps of:
providing multiple views for the document object each view specifying a graphical representation of the document object;
selecting one of the views for the document to display in a frame on the video display; and
displaying the selected view in the frame on the video display.

17. The method of claim 16, further comprising the step of displaying a second of the multiple views for the document object in a second frame.

18. The method of claim 16 wherein the document object is embedded in a container object.

19. The method of claim 18 wherein the container object provides the frame.

20. A computer system comprising:
a video display;
a document object;
a container object in which the document object is embedded;
a view having at least one page for the document object to be displayed in a view port, said view specifying appearance of each page of the view; and
a frame provider for providing the view port in the container object into which the view for the document object is displayed on the video display such that each page of the view has the appearance specified by the view.

21. The computer system of claim 20 wherein the frame provider is the container object.

22. The computer system of claim 20 wherein the frame provider is different from the container object.

23. The computer system of claim 20, further comprising an additional view for the document object.

24. The computer system of claim 23, further comprising a second frame provider for providing a second frame that provides a view port in which to display the additional view for the document object.

25. The computer system of claim 20, further comprising a second frame provider that provides a second frame that provides a view in which to display the view for the document object.

26. The computer system of claim 20 wherein the view includes multiple pages.

27. The computer system of claim 20 wherein the view includes a graphical representation of a toolbar.

28. A storage medium for storing a document object;
a container object in which the document object is embedded;
a view, having at least one page, for the document object to be displayed in a view port, said view specifying appearance of each page of the view; and
a frame provider for providing the view port in the container object into which the view of the document object is displayed such that each page of the view has the appearance specified by the view.

* * * * *